(12) United States Patent
Buntel et al.

(10) Patent No.: US 8,361,585 B2
(45) Date of Patent: Jan. 29, 2013

(54) OPTICAL DATA STORAGE MEDIA CONTAINING AN ENCAPSULATED DATA LAYER

(76) Inventors: Christopher J. Buntel, Spanish Fork, UT (US); Douglas P. Hansen, Spanish Fork, UT (US); Matthew R. Linford, Orem, UT (US); Barry M. Lunt, Provo, UT (US); Christopher M. Miller, Pleasant Grove, UT (US); Raymond T. Perkins, Orem, UT (US); Mark O. Worthington, Montrose, CA (US)

( * ) Notice: Subject to any disclaimer, the term of this patent is extended or adjusted under 35 U.S.C. 154(b) by 348 days.

(21) Appl. No.: 12/650,463

(22) Filed: Dec. 30, 2009

(65) Prior Publication Data

US 2010/0182894 A1    Jul. 22, 2010

Related U.S. Application Data

(60) Provisional application No. 61/203,962, filed on Dec. 31, 2008.

(51) Int. Cl.
*B32B 3/02* (2006.01)
(52) U.S. Cl. ............... 428/64.1; 428/64.4; 430/270.11
(58) Field of Classification Search ............ 428/64.4; 430/270.11
See application file for complete search history.

(56) References Cited

U.S. PATENT DOCUMENTS

| | | | |
|---|---|---|---|
| 4,613,966 A | 9/1986 | Di Stefano et al. | |
| 4,807,220 A | 2/1989 | Miyai et al. | |
| RE35,947 E | 11/1998 | Kosinski et al. | |
| 5,989,669 A * | 11/1999 | Usami | 428/64.1 |
| 6,238,764 B1 | 5/2001 | Usami | |
| 6,258,432 B1 * | 7/2001 | Terada et al. | 428/64.1 |
| 2003/0193882 A1 | 10/2003 | Suenaga et al. | |
| 2007/0127352 A1 | 6/2007 | Oshima et al. | |

FOREIGN PATENT DOCUMENTS

| | | |
|---|---|---|
| EP | 1343157 A2 | 9/2003 |
| EP | 1369863 A1 | 12/2003 |

OTHER PUBLICATIONS

RMGProducts.com, "Archival Century Discs", printed from the Internet Dec. 29, 2009, htt://rmgproducts.com/store/archival_gold_centurey_disc_dvds.html, p. 1, advertisement of Mitsubishi's Century Disc.
International Search Report, PCT/US2009/069879, Aug. 17, 2010.

* cited by examiner

*Primary Examiner* — Elizabeth Mulvaney
(74) *Attorney, Agent, or Firm* — Workman Nydegger (57) ABSTRACT

Optical information media containing encapsulated data layers are disclosed. Selective layering of materials in inner radial, middle radial, and outer radial zones allows for the faces and edges of at least the data layers to be encapsulated by other materials, resulting in increased resistance to harmful environmental agents such as oxygen and moisture.

13 Claims, 9 Drawing Sheets

OPTICAL DATA STORAGE MEDIA CONTAINING AN ENCAPSULATED DATA LAYER

The present application claims priority to U.S. Provisional Patent Application Ser. No. 61/203,962 filed Dec. 31, 2008, the contents of which are incorporated herein by reference.

FIELD OF THE INVENTION

The invention relates to digital storage media having data layers encapsulated on all sides from environmental hazards.

DESCRIPTION OF RELATED ART

Optical storage media such as compact discs (CDs) and digital video discs (DVDs) are made of a complex layered series of materials. Failure in or between any of the layers can result in an inoperable disc, and loss of data. The lifetime of current commercial discs is significantly shorter than most consumers realize. Large institutions are more likely to be aware of the shortcomings of commercial discs, and must engage in costly and time consuming copying of data onto fresh media in order to avoid loss of data.

Disc failure can result from a variety of causes. Physical stress from bending, cracking, or breaking of the disc can permanently damage the disc, thereby preventing reading of data. Environmental stress such as oxygen, moisture, heat, or cold can degrade materials in the disc, or cause delamination of the layers themselves. Age can also lead to loss of data, as materials in the disc can oxidize or otherwise degrade over time. Damage to the data layer itself is particularly harmful to long term data storage efforts.

Encapsulation has been used to protect the reflective layer of optical discs. For example, the "Century Disc" released by Mitsubishi in 2004 contains a silver reflective layer encapsulated by a protective 24-karat gold overcoat. The gold is described as protecting the silver reflective layer from corrosion.

U.S. Pat. No. 4,613,966 (issued Sep. 23, 1986) describes an optical floppy disc entirely encapsulated in an air tight protective housing. The disc and housing are rotated as a single unit, even though the housing is separate from the disc.

Current commercially available optical information media fail to deliver long term data storage. Accordingly, there exists a need for technologies that improve the lifetime of media and the data stored therein.

SUMMARY OF THE INVENTION

Optical information media having encapsulated data layers are disclosed. Encapsulating layers are used to fully enclose at least the data layer, protecting it from external environmental agents such as oxygen and moisture. This protection enhances the long term stability of the media.

DESCRIPTION OF THE FIGURES

The following figures form part of the present specification and are included to further demonstrate certain aspects of the invention. The invention may be better understood by reference to one or more of these figures in combination with the detailed description of specific embodiments presented herein.

DETAILED DESCRIPTION OF THE INVENTION

While compositions and methods are described in terms of "comprising" various components or steps (interpreted as meaning "including, but not limited to"), the compositions and methods can also "consist essentially of" or "consist of" the various components and steps, and such terminology should be interpreted as defining essentially closed-member groups.

Materials

Optical information media can generally be any shape and size. A currently preferred shape is a flat, round disc. Other shapes include a drum or a linear tape. Currently envisioned media include flat, round shapes in sizes including about 8 cm diameter, about 12 cm diameter (like a conventional CD or DVD), about 13 cm diameter, about 20 cm diameter, about 10 inch (about 25.4 cm) diameter, about 26 cm diameter, and about 12 inch (about 30.48 cm) diameter. Discs contain an inner radial portion, a middle radial portion, an outer radial portion, and an outer edge. The inner radial portion can optionally include a hole and an inner edge.

Figure 1:
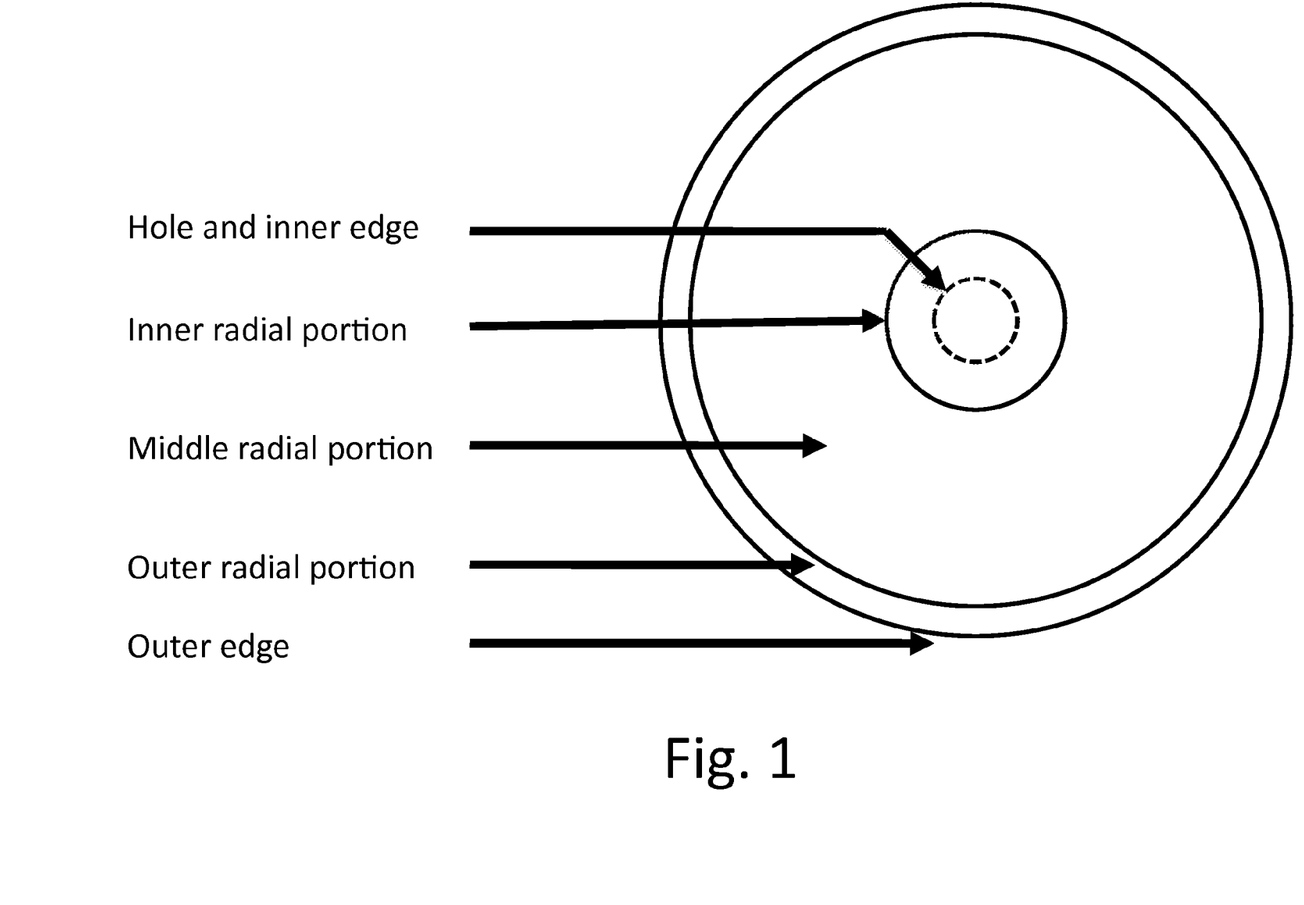
FIG. 1 shows a typical flat, round optical information medium having an inner radial portion, a middle radial portion, an outer radial portion, and an outer edge.

One embodiment of the present invention is directed to an optical information medium having an inner radial portion, a middle radial portion, and an outer radial portion (as shown in FIG. 1). The optical information medium comprises at least one support substrate and at least one data layer. The support substrate is present in the inner radial portion, the middle radial portion, and the outer radial portion. The data layer is present in the middle radial portion, but not in the inner radial portion and not in the outer radial portion. In this configuration, the data layer does not contact the inner edge or the outer edge of the optical information medium. In FIGS. 2-9, the right hand section corresponds to the inner radial portion, the left hand section corresponds to the outer radial portion, and the central section corresponds to the middle radial portion.

The optical information medium further comprises at least one encapsulating layer that encapsulates one or two or more layers beneath it, such as one, two, three, four, five, six, seven, eight, or more layers. In other words, the encapsulating layer covers and surrounds one or more layers positioned beneath it. The one or more layers beneath the encapsulating layer includes the data layer. The encapsulating layer facially contacts the topmost one or more layers beneath it, and is present in the inner radial portion, the middle radial portion, and the outer radial portion to encapsulate the one or more layers beneath it. The encapsulating layer covers the edges of the one or more layers beneath it, as shown in FIGS. 2-9. The encapsulating layer covers at least the edges of the data layer, and covers the top face of the data layer if it is the topmost layer underneath the encapsulating layer. Encapsulating the data layer prevents the data layer from being exposed to the outside environment, and provides a degree of protection against external hazards.

In most basic form, an embodiment of the invention can be an optical information medium comprising an encapsulated data layer. In a relatively more complex embodiment, the optical information medium can comprise at least one support substrate and at least one encapsulated data layer.

The encapsulating layer can generally be any material. Examples of the encapsulating layer are a dielectric layer, a reflective layer, a thermal barrier layer, a heat sink layer, or a polymer coating layer. The encapsulating layer can mechanically stiffen the optical information medium, balance stress in the various layers, and result in a physically flatter medium than a similar medium prepared without an encapsulating layer.

While the specific chemical makeup of the various layers are not critical to the various embodiments of the invention, the following paragraphs present non-exhaustive examples of suitable materials.

The support substrate can generally be any material compatible with use in optical information storage. Polymers or ceramic materials having desirable optical and mechanical properties are widely available. Support substrates typically comprise polycarbonate, polystyrene, aluminum oxide, polydimethyl siloxane, polymethylmethacrylate, silicon oxide, glass, aluminum, stainless steel, or mixtures thereof. If substrate transparency is not desired, metal substrates may be used. Other optically transparent plastics or polymers may also be used. Support substrates can be selected from materials having sufficient rigidity or stiffness. Stiffness of a support substrate is commonly characterized as Young's modulus in units of pressure per unit area, and preferably is about 0.5 GPa to about 70 GPa. Specific examples of stiffness values are about 0.5 GPa, about 1 GPa, about 5 GPa, about 10 GPa, about 20 GPa, about 30 GPa, about 40 GPa, about 50 GPa, about 60 GPa, about 70 GPa, and ranges between any two of these values. Support substrates can be selected from materials having an index of refraction of about 1.45 to about 1.70. Specific examples of an index of refraction include about 1.45, about 1.5, about 1.55, about 1.6, about 1.65, about 1.7, and ranges between any two of these values.

The support substrate preferably comprises materials that are not subject to age degradation effects. Presently preferred materials are polycarbonate, glass, and silicon oxide (fused silica).

The support substrate can generally be any thickness. The substrate thickness can be selected as a function of the drive capacity: 1.2 millimeter-thick substrates are compatible with CD drives, 0.6 millimeter-thick substrates are compatible with DVD drives, and 0.1 millimeter-thick substrates are compatible with BD drives.

The data layer comprises one or more materials that can undergo a detectable change upon exposure to energy. Lasers are typically used in optical media drives to write data by effecting a phase change, contrast change, or other change that is detectable by reading with a laser at lower power.

The data layer can comprise at least one organic material or at least one inorganic material. Typical organic materials are organic dyes. Cyanine dyes are commonly used in optical media, with phthalocyanine dyes and azo-cyanine dyes being of particular commercial importance. Inorganic materials are commonly metals, metal alloys, or phase change alloys. Examples of metals and metal alloys include tellurium, tellurium alloys, selenium, selenium alloys, arsenic, arsenic alloys, tin, tin alloys, bismuth, bismuth alloys, antimony, antimony alloys, lead, lead alloys, germanium-antimony-tellurium, and silver-indium-antimony-tellurium. Alternatively, the data layer can comprise at least one metal oxide.

Dielectric layers act as electrical insulators, effectively separating different layers of the optical disc. The dielectric layer can comprise an inorganic material, such as, silicon, silicon dioxide, zinc sulfide-silicon dioxide, zirconium oxide, titanium oxide, tantalum oxide, germanium nitride, silicon-nickel oxynitride, or combinations thereof. Dielectric layers containing silicon dioxide are currently widely used in commercial products. The dielectric layer can comprise at least one nitride material such as silicon nitride, carbon nitride, or boron nitride. The dielectric layer can also comprise aluminum oxide.

A reflective layer reflects laser light back towards the reading assembly. The reflective layer can comprise a metal or metal alloy. Examples of metals and metal alloys include gold, silver, copper, aluminum, nickel, chromium, titanium, and their alloys.

A thermal barrier can protect the support substrate from heat generated during writing data to the data layer. Examples of thermal barrier layers include silicon dioxide, carbon, aluminum oxide, silicon, silicon nitride, boron nitride, titanium oxides ($TiO_x$), and tantalum oxides ($TaO_x$).

A polymer coating layer can provide scratch resistance and environmental resistance to the optical information medium. The polymer coating layer is preferably optically clear. The polymer coating layer can also increase the rigidity or stiffness of the medium, thereby improving resistance to flexing damage.

A skilled artisan can select from a wide array of polymer coating layer materials. Examples of materials suitable for use in the polymer coating layer include acrylates, styrenes, carbonates, urethanes, ethylenes, acetates, acrylonitriles, acrylamides, polyphenolic resins, polyepoxides, and polyalcohols.

The following paragraphs describe several specific embodiments of the invention. While these embodiments are intended to illustrate various combinations of layers in an optical information medium, many additional embodiments are possible.

Figure 2:
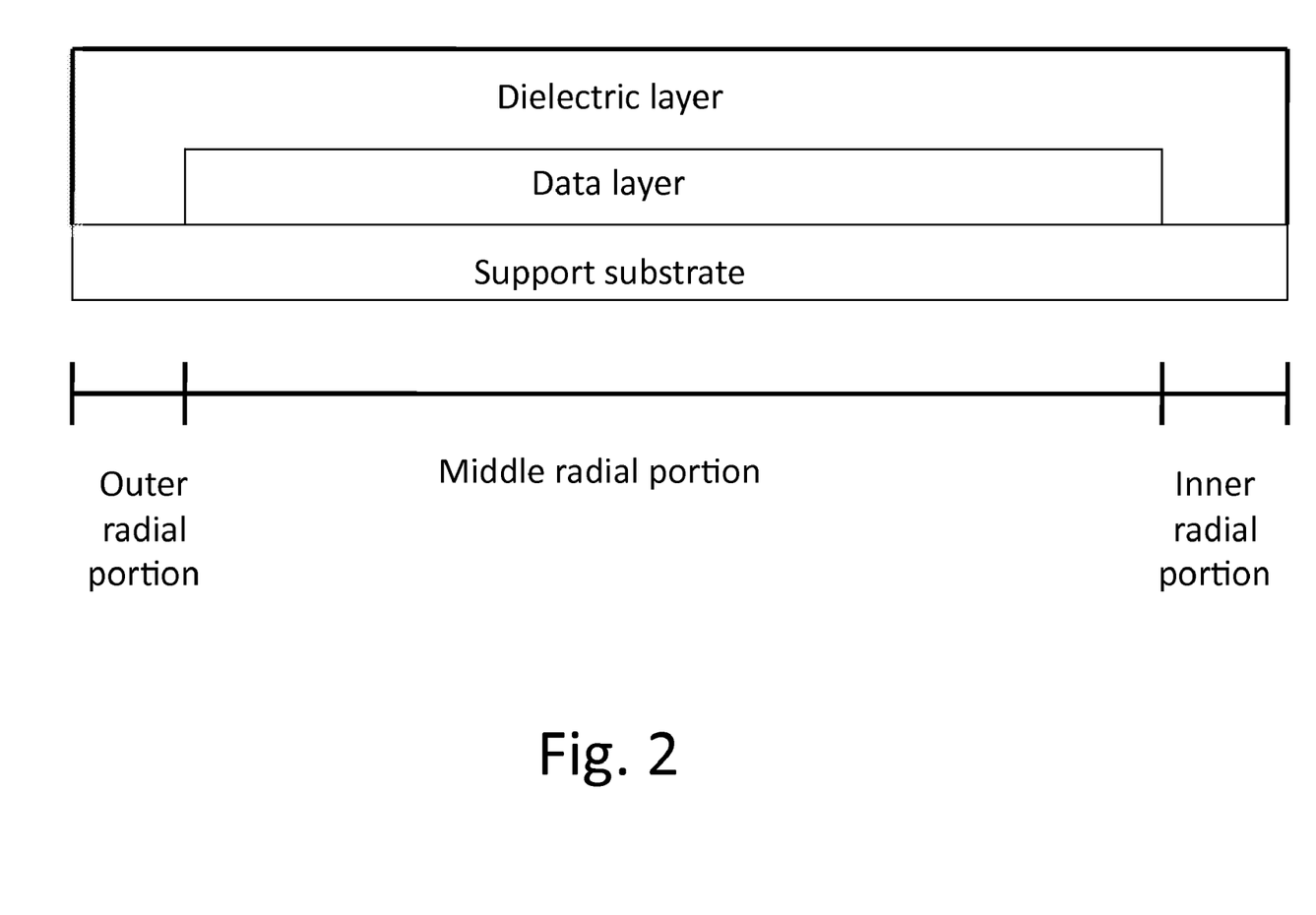
FIG. 2 shows a cross-section of an optical information medium. The data layer is encapsulated by the dielectric layer.

One embodiment is shown in FIG. 2, where a dielectric layer acts as an encapsulating layer. The optical information medium comprises a support substrate, a data layer, and a dielectric layer. As shown in FIG. 2, the support substrate is present in the inner radial portion, the middle radial portion, and the outer radial portion; the data layer is present in the middle radial portion, but not in the inner radial portion or the outer radial portion; and the dielectric layer is present in the inner radial portion, the middle radial portion, and the outer radial portion. The dielectric layer encapsulates the data layer.

In FIG. 2, a cross-section of the inner radial portion would intersect the dielectric layer, then the support substrate, but not the data layer. A cross-section of the middle radial portion would intersect the dielectric layer, then the data layer, then the support substrate. A cross-section of the outer radial portion would intersect the dielectric layer, then the support substrate, but not the data layer.

Figure 3:
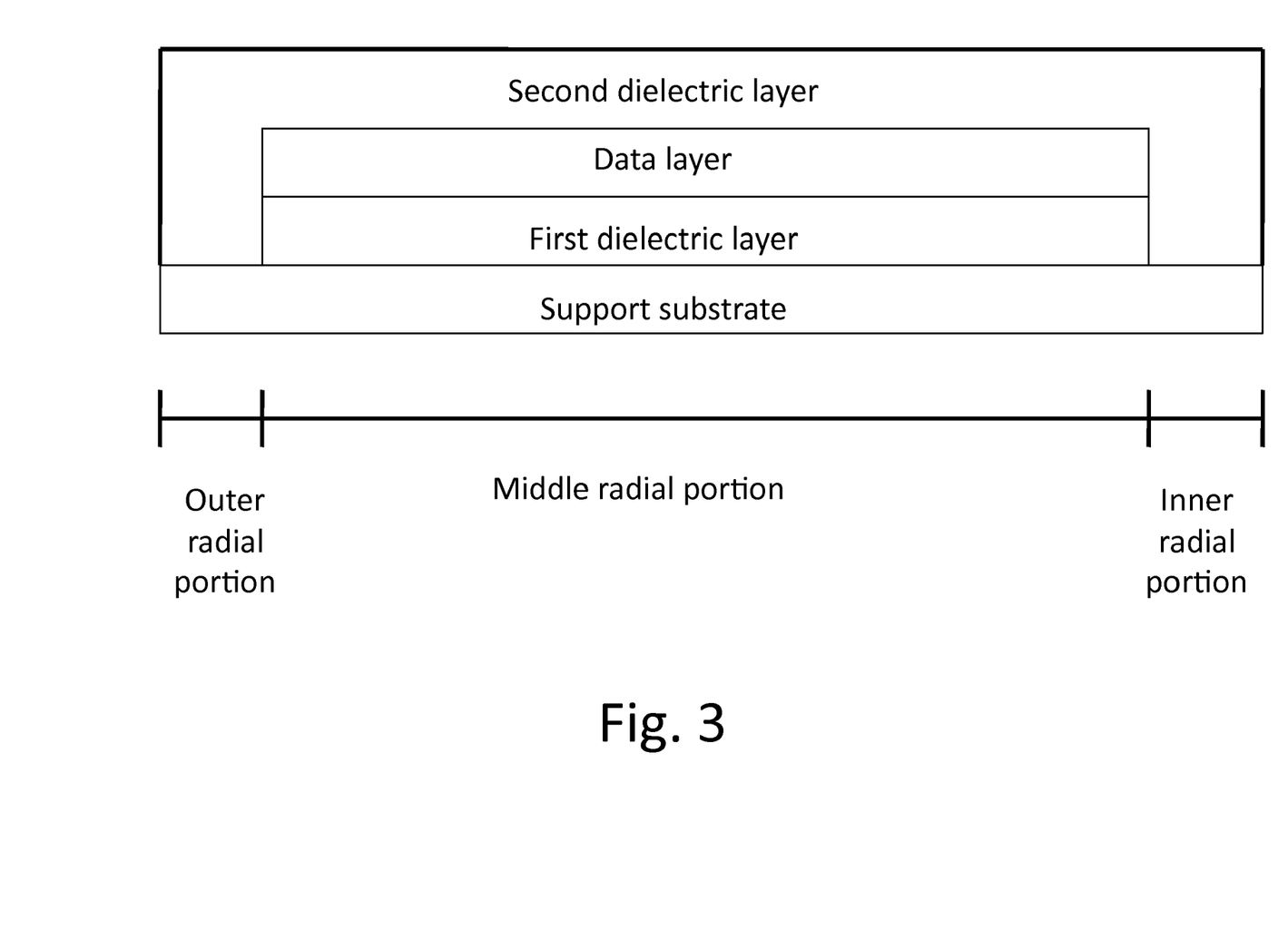
FIG. 3 shows a cross-section of an optical information medium. The data layer and the first dielectric layer are encapsulated by the second dielectric layer.

An additional embodiment is shown in FIG. 3, where a second dielectric layer acts as an encapsulating layer. The optical information medium comprises a support substrate, a first dielectric layer, a data layer, and a second dielectric layer. The optical information medium comprises a support substrate present in the inner radial portion, the middle radial portion, and the outer radial portion; a first dielectric layer present in the middle radial portion, but not in the inner radial portion or the outer radial portion; a data layer present in the middle radial portion, but not in the inner radial portion or the outer radial portion; and a second dielectric layer present in the inner radial portion, the middle radial portion, and the outer radial portion that encapsulates the data layer and the first dielectric layer.

In FIG. 3, a cross-section of the inner radial portion would intersect the second dielectric layer, then the support substrate, but not the data layer or the first dielectric layer. A cross-section of the middle radial portion would intersect the second dielectric layer, then the data layer, then the first dielectric layer, then the support substrate. A cross-section of the outer radial portion would intersect the second dielectric layer, then the support substrate, but not the data layer or the first dielectric layer.

Figure 4:
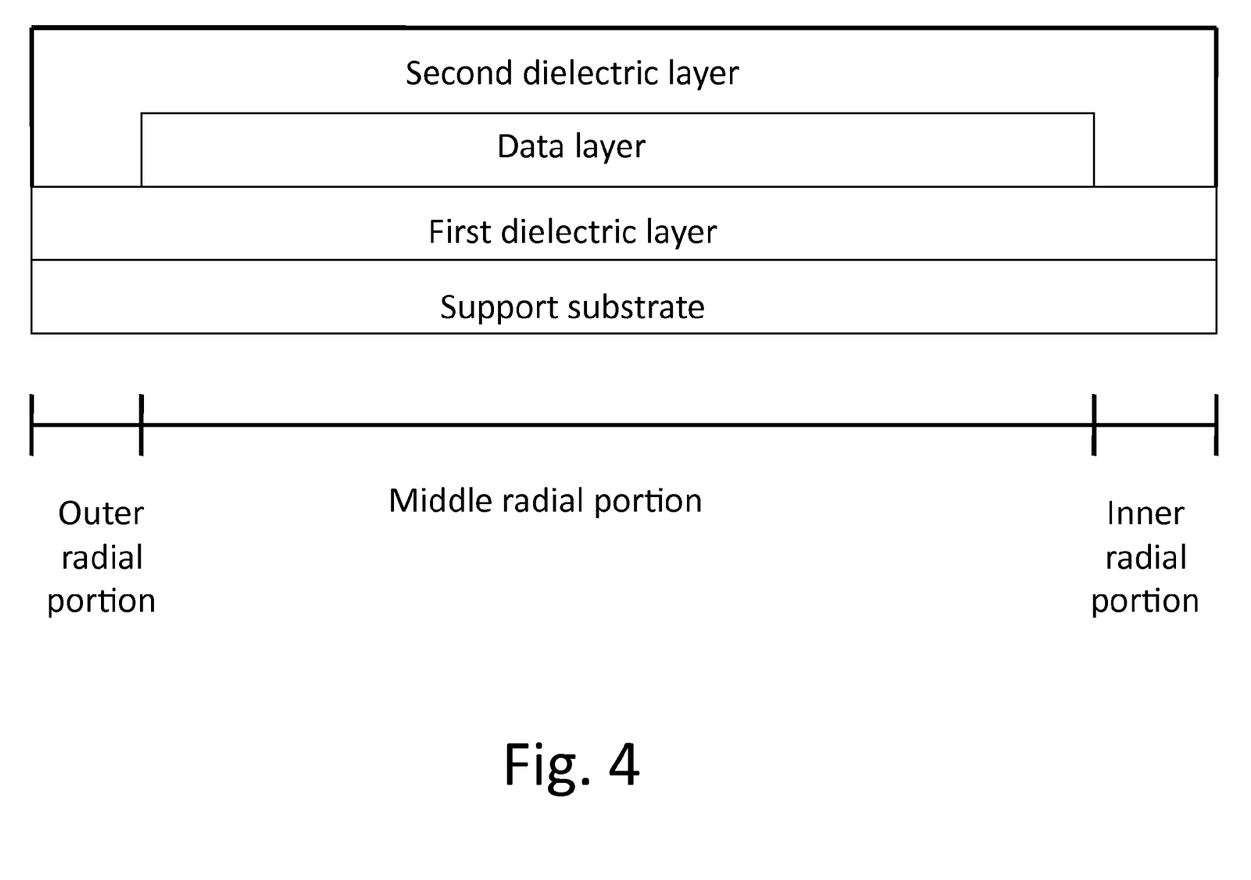
FIG. 4 shows a cross-section of an optical information medium. The data layer, but not the first dielectric layer, is encapsulated by the second dielectric layer.

Another embodiment of the invention is shown in FIG. 4, where a second dielectric layer acts as an encapsulating layer. The optical information medium comprises a support substrate, a first dielectric layer, a data layer, and a second dielectric layer. The optical information medium comprises a support substrate present in the inner radial portion, the middle radial portion, and the outer radial portion; a first dielectric layer present in the inner radial portion, the middle radial portion, and the outer radial portion; a data layer present in the middle radial portion, but not in the inner radial portion or the outer radial portion; and a second dielectric layer present in the inner radial portion, the middle radial portion, and the outer radial portion that encapsulates the data layer.

In FIG. 4, a cross-section of the inner radial portion would intersect the second dielectric layer, then the first dielectric layer, then the support substrate, but not the data layer. A cross-section of the middle radial portion would intersect the second dielectric layer, then the data layer, then the first dielectric layer, then the support substrate. A cross-section of the outer radial portion would intersect the second dielectric layer, then the first dielectric layer, then the support substrate, but not the data layer.

Figure 5:
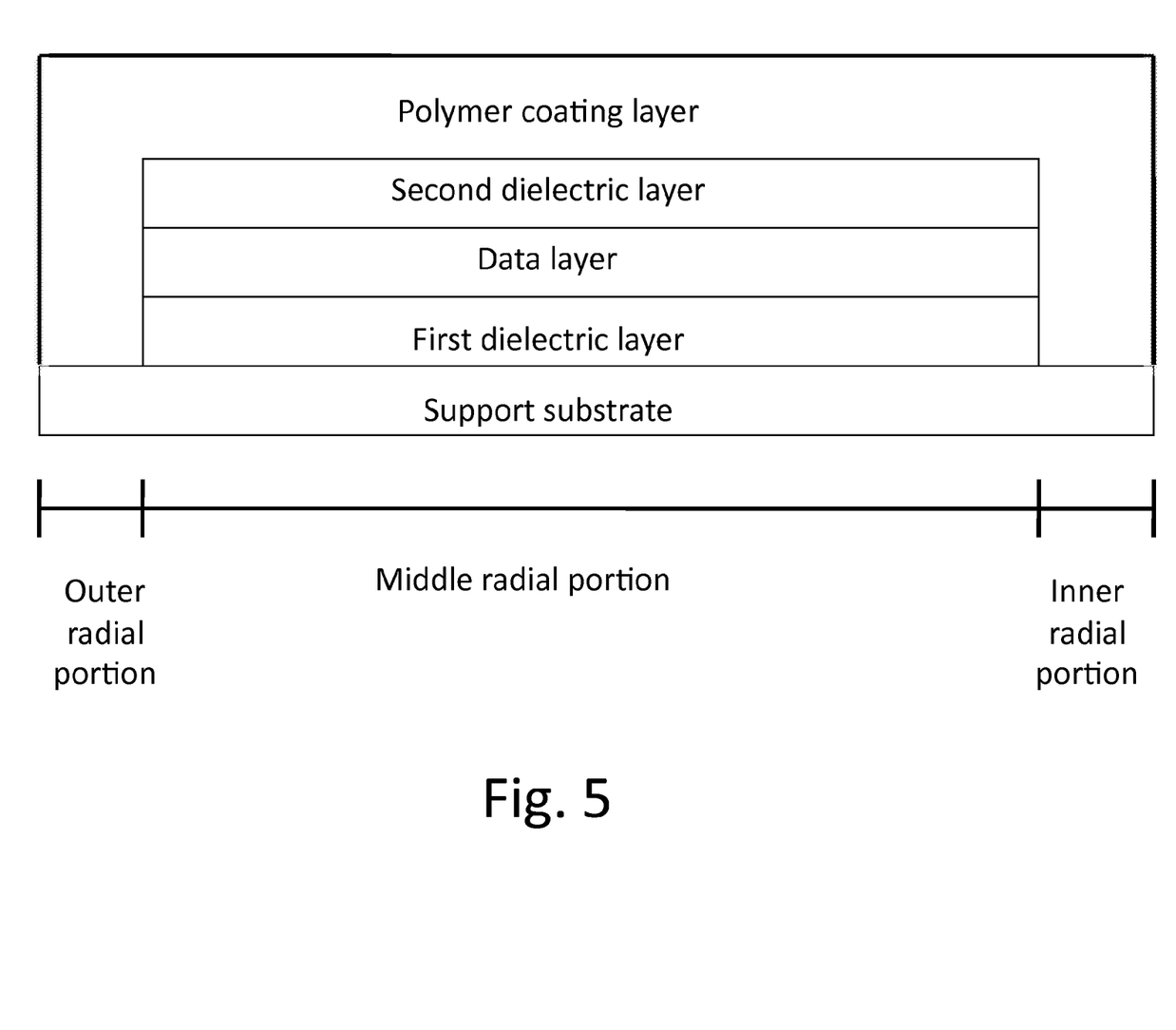
FIG. 5 shows a cross-section of an optical information medium. The second dielectric layer, the data layer, and the first dielectric layer are encapsulated by the polymer coating layer.

An additional embodiment is shown in FIG. 5, where a polymer coating layer acts as an encapsulating layer. The optical information medium comprises a support substrate, a first dielectric layer, a data layer, a second dielectric layer, and a polymer coating layer. The optical information medium comprises a support substrate present in the inner radial portion, the middle radial portion, and the outer radial portion; a first dielectric layer present in the middle radial portion, but not the inner radial portion and the outer radial portion; a data layer present in the middle radial portion, but not in the inner radial portion or the outer radial portion; a second dielectric layer present in the middle radial portion, but not the inner radial portion and the outer radial portion; and a polymer coating layer present in the inner radial portion, the middle radial portion, and outer radial portion that encapsulates the second dielectric layer, the data layer, and the first dielectric layer.

In FIG. 5, a cross-section of the inner radial portion would intersect the polymer coating layer, then the support substrate, but not the first dielectric layer, the data layer, and the second dielectric layer. A cross-section of the middle radial portion would intersect the polymer coating layer, then the second dielectric layer, then the data layer, then the first dielectric layer, then the support substrate. A cross-section of the outer radial portion would intersect the polymer coating layer, then the support substrate, but not the second dielectric layer, the data layer, and the first dielectric layer.

Figure 6:
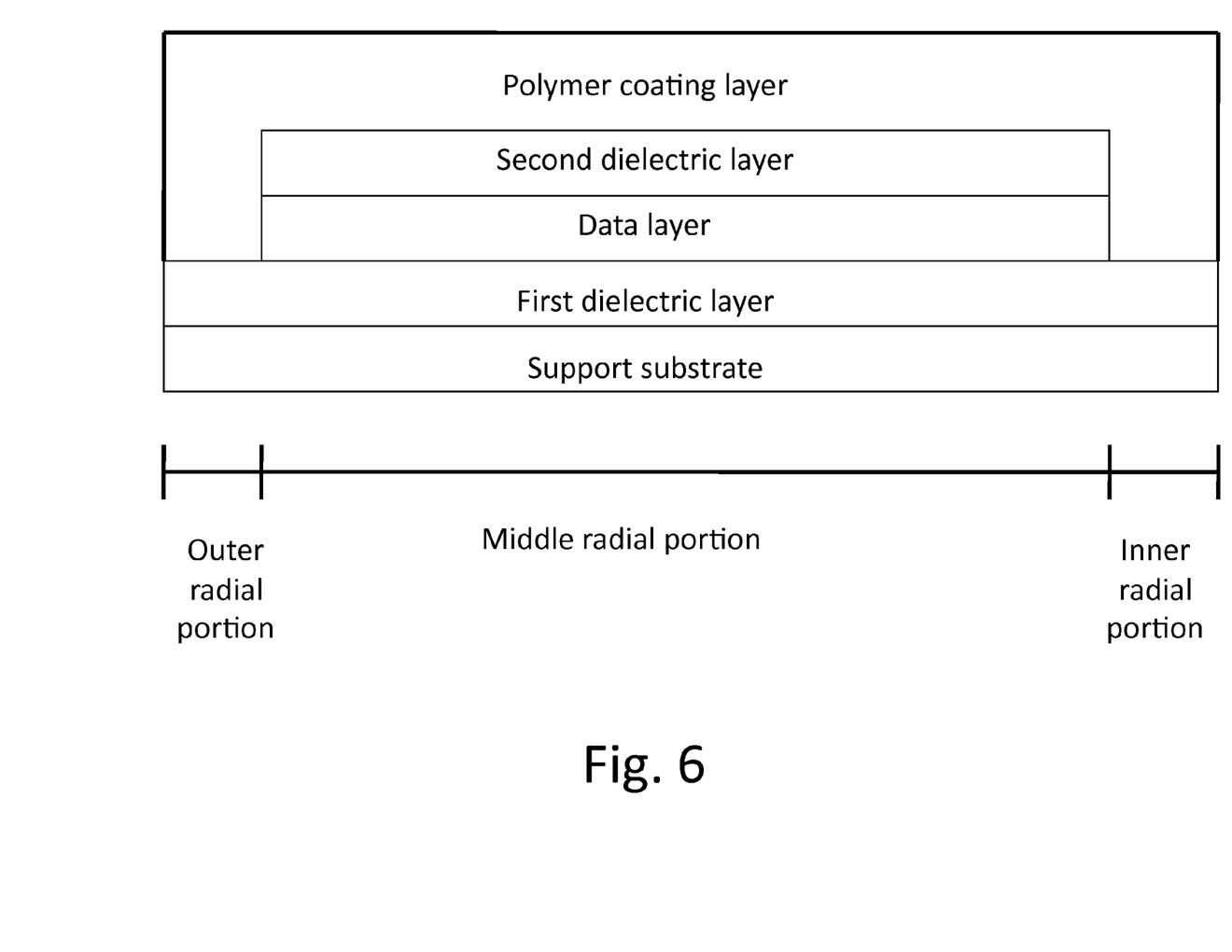
FIG. 6 shows a cross-section of an optical information medium. The data layer, and second dielectric layer, but not the first dielectric layer, are encapsulated by the polymer coating layer.

Yet another embodiment is shown in FIG. 6, where a polymer coating layer acts as an encapsulating layer. The optical information medium comprises a support substrate, a first dielectric layer, a data layer, a second dielectric layer, and a polymer coating layer. The optical information medium comprises a support substrate present in the inner radial portion, the middle radial portion, and the outer radial portion; a first dielectric layer present in the inner radial portion, the middle radial portion, and the outer radial portion; a data layer present in the middle radial portion, but not in the inner radial portion or the outer radial portion; a second dielectric layer present in the middle radial portion, but not the inner radial portion and the outer radial portion; and a polymer coating layer present in the inner radial portion, the middle radial portion, and outer radial portion that encapsulates the second dielectric layer, and the data layer.

In FIG. 6, a cross-section of the inner radial portion would intersect the polymer coating layer, then the first dielectric layer, then the support substrate, but not the second dielectric layer and the data layer. A cross-section of the middle radial portion would intersect the polymer coating layer, then the second dielectric layer, then the data layer, then the first dielectric layer, then the support substrate. A cross-section of the outer radial portion would intersect the polymer coating layer, then the first dielectric layer, then the support substrate, but not the second dielectric layer and the data layer.

Figure 7:
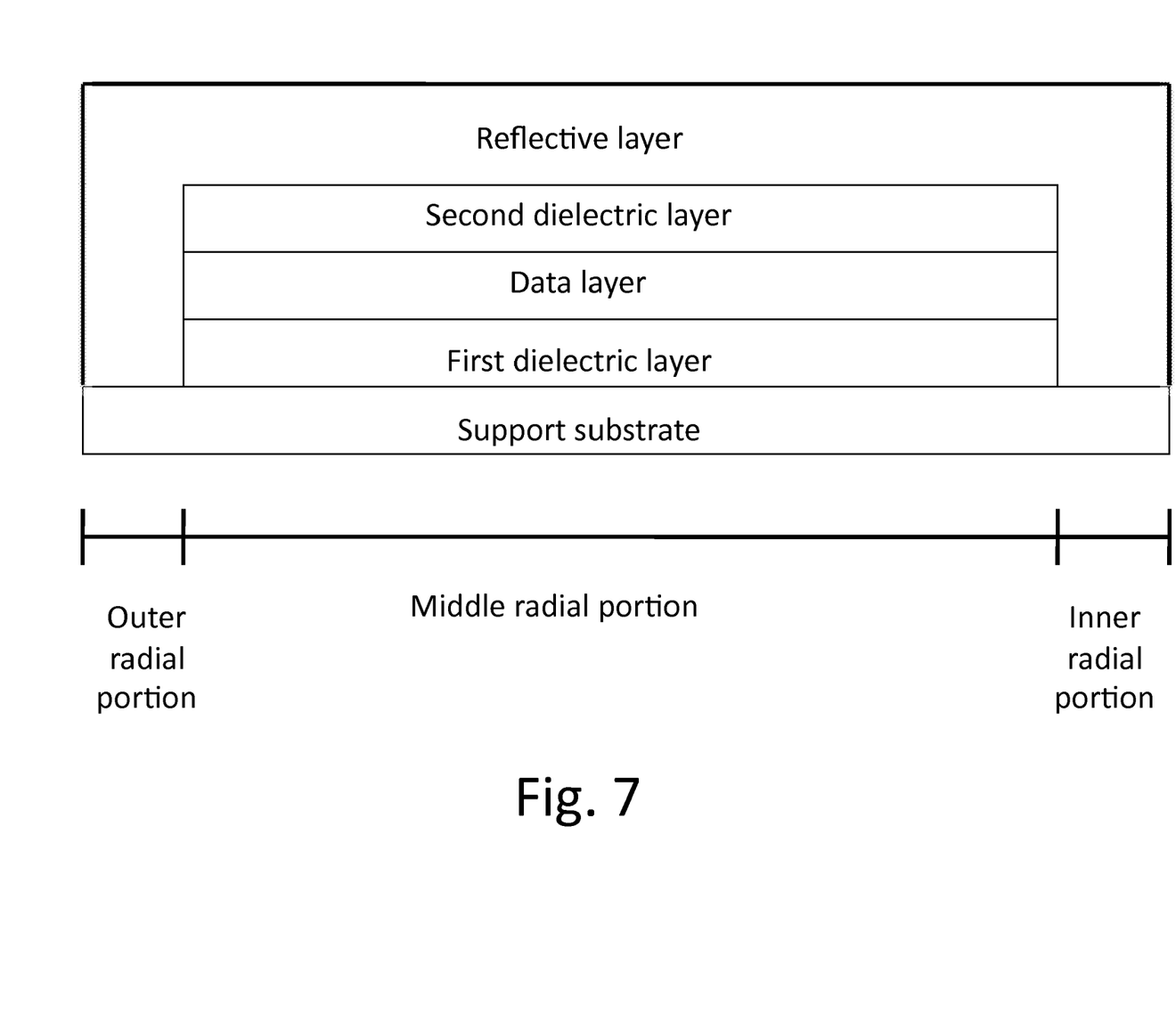
FIG. 7 shows a cross-section of an optical information medium. The second dielectric layer, the data layer, and the first dielectric layer are encapsulated by the reflective layer.

Another embodiment is shown in FIG. 7, where a reflective layer acts as an encapsulating layer. The optical information medium comprises a support substrate, a first dielectric layer, a data layer, a second dielectric layer, and a reflective layer. The optical information medium comprises a support substrate present in the inner radial portion, the middle radial portion, and the outer radial portion; a first dielectric layer present in the middle radial portion, but not the inner radial portion and the outer radial portion; a data layer present in the middle radial portion, but not in the inner radial portion or the outer radial portion; a second dielectric layer present in the middle radial portion, but not the inner radial portion and the outer radial portion; and a reflective layer present in the inner radial portion, the middle radial portion, and outer radial portion that encapsulates the second dielectric layer, the data layer, and the first dielectric layer.

In FIG. 7, a cross-section of the inner radial portion would intersect the reflective layer, then the support substrate, but not the first dielectric layer, the data layer, and the second dielectric layer. A cross-section of the middle radial portion would intersect the reflective layer, then the second dielectric layer, then the data layer, then the first dielectric layer, then the support substrate. A cross-section of the outer radial portion would intersect the reflective layer, then the support substrate, but not the second dielectric layer, the data layer, and the first dielectric layer.

Figure 8:
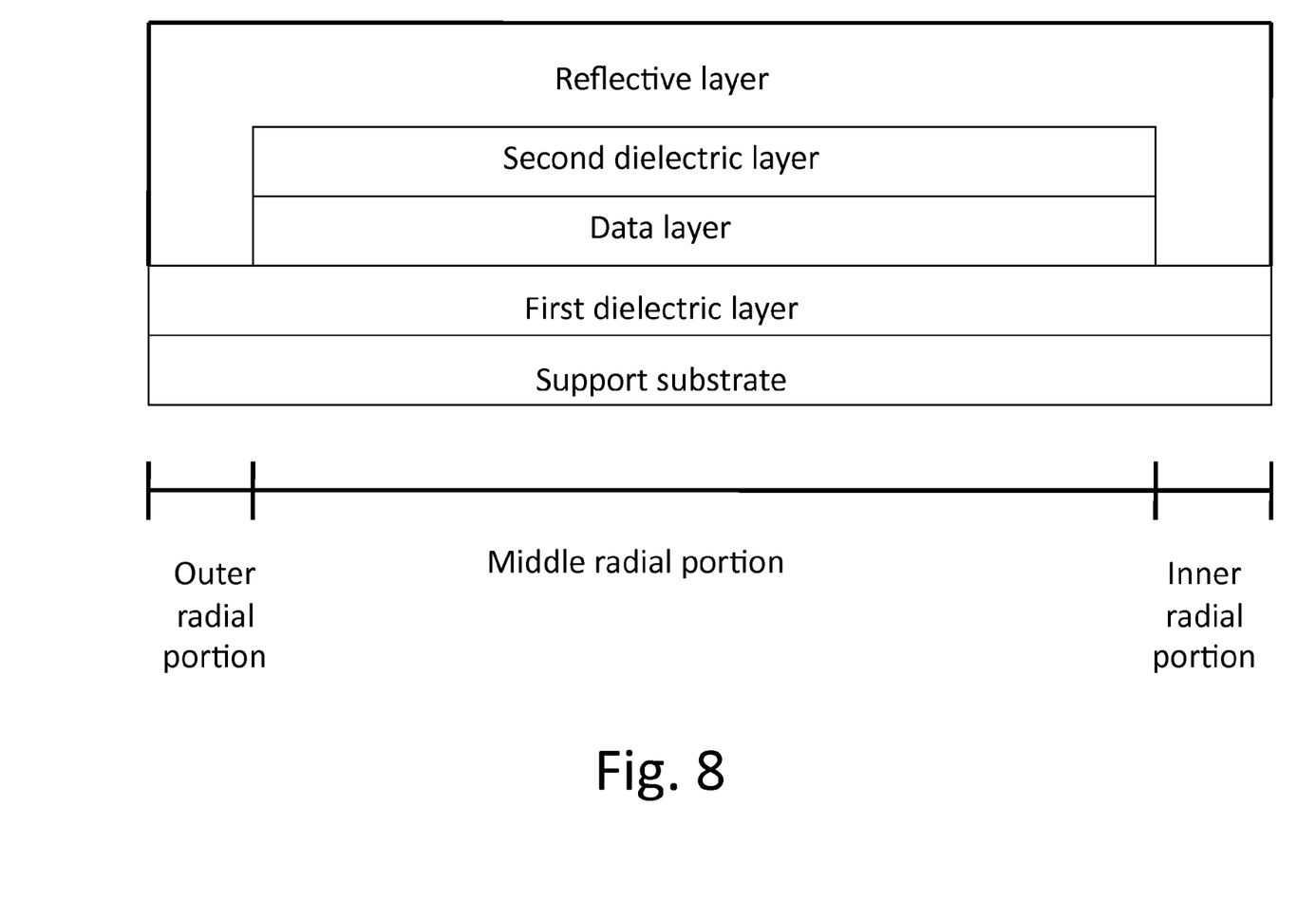
FIG. 8 shows a cross-section of an optical information medium. The second dielectric layer and data layer, but not the first dielectric layer, are encapsulated by the reflective layer.

An additional embodiment of the invention is shown in FIG. 8, where a reflective layer acts as an encapsulating layer. The optical information medium comprises a support substrate, a first dielectric layer, a data layer, a second dielectric layer, and a reflective layer. The optical information medium comprises a support substrate present in the inner radial portion, the middle radial portion, and the outer radial portion; a first dielectric layer present in the inner radial portion, the middle radial portion, and the outer radial portion; a data layer present in the middle radial portion, but not in the inner radial portion or the outer radial portion; a second dielectric layer present in the middle radial portion, but not the inner radial portion and the outer radial portion; and a reflective layer present in the inner radial portion, the middle radial portion, and outer radial portion that encapsulates the second dielectric layer and the data layer.

In FIG. 8, a cross-section of the inner radial portion would intersect the reflective layer, then the first dielectric layer, then the support substrate, but not the second dielectric layer and the data layer. A cross-section of the middle radial portion would intersect the reflective layer, then the second dielectric layer, then the data layer, then the first dielectric layer, then the support substrate. A cross-section of the outer radial portion would intersect the reflective layer, then the first dielectric layer, then the support substrate, but not the second dielectric layer and the data layer.

The various layers of the optical information medium can be arranged in a wide array of orders. The data layer can facially contact the support substrate, or there can be one or more intervening layers. A dielectric layer can be disposed between the support substrate and the data layer. Alternatively, a dielectric layer can be disposed away from both the support substrate and the data layer, where the distance from the dielectric layer to the data layer is less than the distance from the dielectric layer to the support substrate. The optical information medium can comprise two dielectric layers, where the first dielectric layer is disposed on one side of the data layer, and the second dielectric layer is disposed on the opposite side of the data layer.

Figure 9:
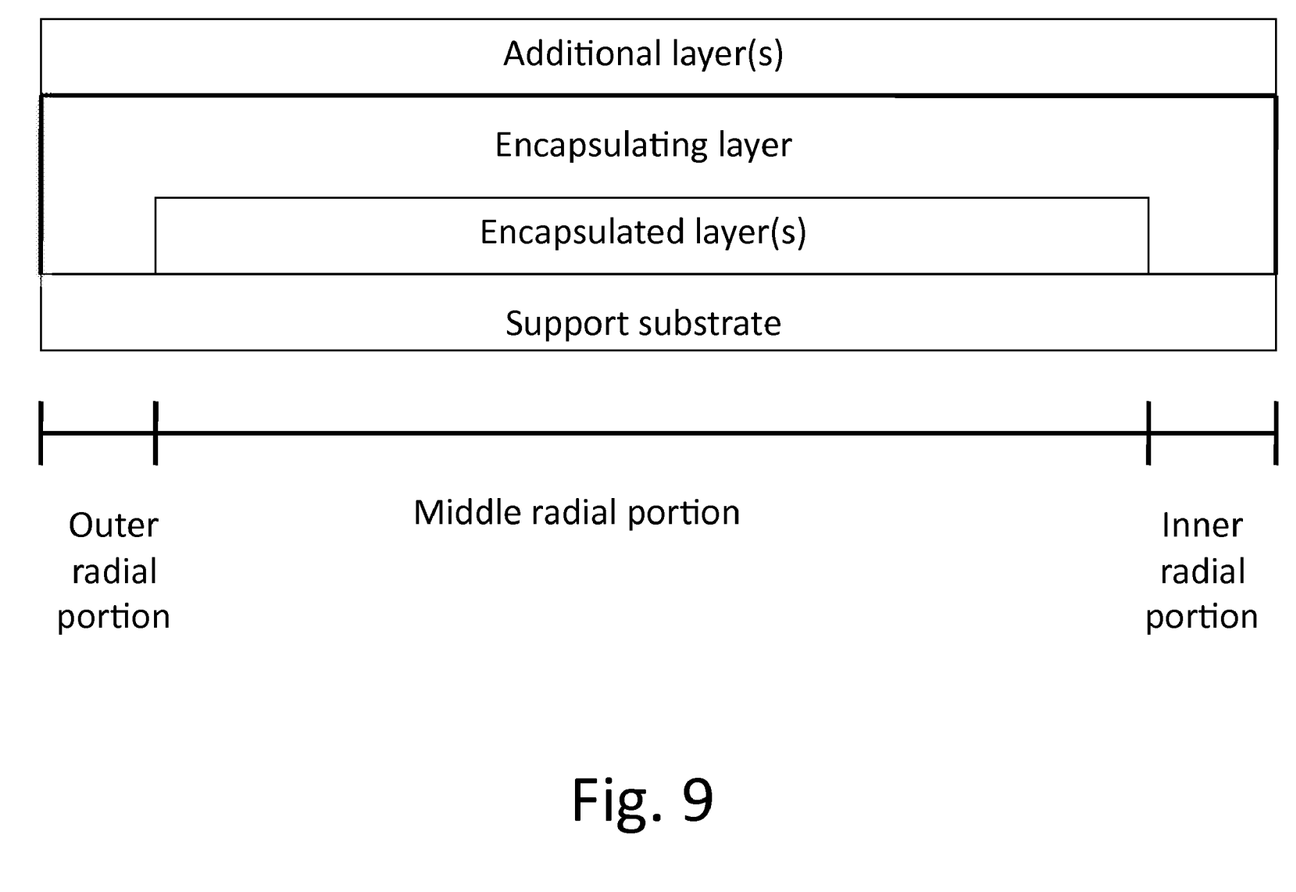
FIG. 9 shows a cross-section of an optical information medium, in which one or more additional layers are placed on top of the encapsulating layer.

While FIGS. 2-8 show the encapsulating layer as the topmost layer, one or more additional layers can be placed on top of the encapsulating layer. This alternative embodiment of the invention is shown in FIG. 9.

Methods of Preparation

Various embodiments of the invention are directed to methods of preparing an optical information medium.

The layers of the optical information medium can be stacked in various orders, depending on the particular layering desired in the final optical information medium product. The layers can be applied on one side of the support substrate, resulting in a final product having the support substrate on one outer face. Alternatively, the layers can be applied onto both sides of the support substrate, resulting in a final product having the support substrate located such that it is not an outer face of the final product.

Certain methods use a mask in the application of layers to the middle radial portion, but not to the inner radial portion and/or the outer radial portion. For example, a first mask can be applied to the outer radial portion, and a second mask can be applied to the inner radial portion in order to facilitate applying the layer to only the middle radial portion. The mask can be included as part of a holder for the medium during manufacture.

The use of a mask is not absolutely required, but in many cases facilitates preparation of the optical information medium. A mask can be used to apply layers to the middle radial portion, or alternatively, the layers can be applied to the inner radial portion, the middle radial portion, and the outer radial portion, and subsequently selectively removed from one or more portions. For example, a data layer can be applied to inner radial portion, the middle radial portion, and the outer radial portion. The data layer can then be removed from the inner radial portion and outer radial portion by applying energy, force, or other removal mechanisms. Alternative removal methods include masking the middle radial portion data layer prior to removing the outer radial portion data layer and inner radial portion data layer. Layers can be removed simultaneously or stepwise. For example, the outer radial portion layer could first be removed, followed by the removal of the inner radial portion layer. The order of this removal regime can be reversed. Alternatively, a solvent or other chemical could be used to simultaneously remove the outer radial portion layer and the inner radial portion layer, while the middle radial portion layer is protected by a mask.

Generally, a method of preparing an optical information medium can comprise providing a support substrate having an inner radial portion, a middle radial portion, and an outer radial portion; applying a data layer to the middle radial portion but not the inner radial portion and outer radial portion; and applying an encapsulating layer to encapsulate at least the data layer. The method can further comprise applying at least one dielectric layer. In addition, the method can comprise applying at least one reflective layer. The method can further comprise applying at least one polymer coating layer. At least one additional layer can be applied before applying the data layer and at least one additional layer can be applied after applying the data layer.

The step of applying a data layer can comprise masking the inner radial portion and outer radial portion before applying the data layer. Alternatively, the applying a data layer step can comprise applying the data layer to the inner radial portion, middle radial portion, and outer radial portion, then removing the data layer from the inner radial portion and the outer radial portion. These two approaches can be used to apply other layers of an optical information medium selectively to the middle radial portion.

One embodiment of the invention relates to a method of preparing an optical information medium, the method comprising providing a support substrate having an inner radial portion, a middle radial portion, and an outer radial portion; applying a data layer to the middle radial portion but not the inner radial portion and outer radial portion; and applying a dielectric layer to the inner radial portion, middle radial portion, and outer radial portion to encapsulate the data layer. This method produces an optical information medium such as the one shown in FIG. 2.

An additional embodiment of the invention relates to a method of preparing an optical information medium, the method comprising providing a support substrate having an inner radial portion, a middle radial portion, and an outer radial portion; applying a first dielectric layer to the middle radial portion but not the inner radial portion and outer radial portion; applying a data layer to the middle radial portion but not the inner radial portion and outer radial portion; and applying a second dielectric layer to the inner radial portion, middle radial portion, and outer radial portion to encapsulate the data layer and the first dielectric layer. This method produces an optical information medium such as the one shown in FIG. 3.

Another embodiment of the invention relates to a method of preparing an optical information medium, the method comprising providing a support substrate having an inner radial portion, a middle radial portion, and an outer radial portion; applying a first dielectric layer to the inner radial portion, middle radial portion, and outer radial portion; applying a data layer to the middle radial portion but not the inner radial portion and outer radial portion; and applying a second dielectric layer to the inner radial portion, middle radial portion, and outer radial portion to encapsulate the data layer but not the first dielectric layer. This method produces an optical information medium such as the one shown in FIG. 4.

Yet another embodiment of the invention relates to a method of preparing an optical information medium, the method comprising providing a support substrate having an inner radial portion, a middle radial portion, and an outer radial portion; applying a first dielectric layer to the middle radial portion but not the inner radial portion and outer radial portion; applying a data layer to the middle radial portion but not the inner radial portion and outer radial portion; applying a second dielectric layer to the middle radial portion but not the inner radial portion and outer radial portion; and applying a polymer coating layer to the inner radial portion, middle radial portion, and outer radial portion to encapsulate the second dielectric layer, the data layer, and the first dielectric layer. This method produces an optical information medium such as the one shown in FIG. 5.

An additional embodiment of the invention relates to a method of preparing an optical information medium, the method comprising providing a support substrate having an inner radial portion, a middle radial portion, and an outer radial portion; applying a first dielectric layer to the inner radial portion, middle radial portion, and outer radial portion; applying a data layer to the middle radial portion but not the inner radial portion and outer radial portion; applying a second dielectric layer to the middle radial portion but not the inner radial portion and outer radial portion; and applying a polymer coating layer to the inner radial portion, middle radial portion, and outer radial portion to encapsulate the second dielectric layer and the data layer but not the first dielectric layer. This method produces an optical information medium such as the one shown in FIG. 6.

A further embodiment of the invention relates to a method of preparing an optical information medium, the method comprising providing a support substrate having an inner radial portion, a middle radial portion, and an outer radial portion; applying a first dielectric layer to the middle radial portion but not the inner radial portion and outer radial portion; applying a data layer to the middle radial portion but not the inner radial portion and outer radial portion; applying a second dielectric layer to the middle radial portion but not the inner radial portion and outer radial portion; and applying a reflective layer to the inner radial portion, middle radial portion, and outer radial portion to encapsulate the second dielectric layer, the data layer, and the first dielectric layer. This method produces an optical information medium such as the one shown in FIG. 7.

An additional embodiment of the invention relates to a method of preparing an optical information medium, the method comprising providing a support substrate having an inner radial portion, a middle radial portion, and an outer radial portion; applying a first dielectric layer to the inner radial portion, middle radial portion, and outer radial portion; applying a data layer to the middle radial portion but not the inner radial portion and outer radial portion; applying a second dielectric layer to the middle radial portion but not the inner radial portion and outer radial portion; and applying a reflective layer to the inner radial portion, middle radial portion, and outer radial portion to encapsulate the second dielectric layer and the data layer but not the first dielectric layer. This method produces an optical information medium such as the one shown in FIG. 8.

Any of the above methods can further comprise the step of applying at least one additional layer, such as, for example, a reflective layer or a polymer coating layer, to the inner radial portion, middle radial portion, and outer radial portion after applying the encapsulating layer. This additional step produces an optical information medium such as the one shown in FIG. 9.

Methods of Use

Any of the above described optical information media can be used to store digital data. Methods can comprise providing an optical information medium comprising: at least one support substrate, and at least one encapsulated data layer, and applying energy to sites in the data layer to cause a detectable change in the data layer. The method can further comprise the step of detecting the change in the data layer.

Applying energy to sites in the data layer can also locally generate sufficient heat to deform tracks in the support substrate, especially when the optical information medium does not contain a thermal barrier layer and/or heat conduction layer. Deformed sites in the support substrate can also be subsequently detected.

Lasers can be used in the applying energy step and in the detecting step. Main classes of lasers include gas, diode-pumped solid state, and diode lasers.

The following examples are provided to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made to the specific embodiments disclosed to obtain a like or similar result without departing from the spirit and scope of the invention.

EXAMPLES

Example 1

Materials and Methods

Polycarbonate blank discs are commercially available from a variety of sources such as Bayer Material Science AG (Leverkusen, Germany), General Electric Company (Fairfield, Conn.), and Teijin Limited (Osaka, Japan). Fused silica blank discs are commercially available from a variety of sources such as Corning Incorporated (Corning, N.Y.), Hoya Corporation (Tokyo, Japan), and Schott AG (Mainz, Germany).

Radio frequency (RF) sputtering was performed using a PVD 75 instrument (Kurt J. Lesker Company; Pittsburgh, Pa.). The system was configured with one RF power supply, three magnetron guns that can hold 3 inch (7.62 cm) targets, and facilities for two sputter gases. The targets were arranged in a sputter-up configuration. Shutters covered each of the three targets. Substrates were mounted on a rotating platen that can be heated up to 200° C. The rotating platen was positioned above the targets. Most of the experimentation was done with no active heating of the platen. With no active heating, the temperature of the platen gradually increases with increased sputtering time at 400 w until the temperature reaches a maximum about 60° C.-70° C. The maximum temperature is reached after about three hours. The initial temperature in the chamber prior to sputtering was typically about 27° C.

Prophetic Example 2

Preparation of an Encapsulated Tellurium Disc

A 12 cm diameter polycarbonate disc can be used as a support substrate. Two circular masks can be placed against the disc to mask the inner radial portion and the outer radial portion. A silica dielectric layer can be sputtered onto the middle radial portion. A tellurium metal data layer can be sputtered onto the middle radial portion on top of the silica dielectric layer. The two masks can then be removed. A second silica dielectric layer can be sputtered to encapsulate the data layer and the first dielectric layer.

This would produce an optical information medium as shown in FIG. 3, where the second silica dielectric layer is the encapsulating layer.

Prophetic Example 3

Preparation of an Encapsulated Tellurium Disc

This Example is similar to Example 2, except that the masks are removed at a different point in the preparation process. A 12 cm diameter polycarbonate disc can be used as a support substrate. A silica dielectric layer can be sputtered onto the inner radial portion, the middle radial portion, and the outer radial portion. Two circular masks can be placed against the dielectric layer to mask the inner radial portion and the outer radial portion. A tellurium metal data layer can be sputtered onto the middle radial portion on top of the silica layer. The two masks can be removed. A second silica dielectric layer can be sputtered to encapsulate the data layer and the first dielectric layer.

This would produce an optical information medium as shown in FIG. 4, where the second silica dielectric layer is the encapsulating layer.

Prophetic Example 4

Preparation of an Encapsulated Alloy Disc

A 12 cm diameter fused silica disc can be used as a support substrate. Two circular masks can be placed against the disc to mask the inner radial portion and the outer radial portion. A zirconium oxide dielectric layer can be sputtered onto the middle radial portion. A tellurium-selenium alloy can be sputtered onto the middle radial portion on top of the dielectric layer to form the data layer. A second zirconium oxide dielectric layer can be sputtered onto the middle radial portion on top of the data layer. The two masks can be removed. An epoxy resin polymer coating layer can be spin coated to encapsulate the second dielectric layer, the data layer, and the first dielectric layer.

This would produce an optical information medium as shown in FIG. 5, where the epoxy resin polymer coating layer is the encapsulating layer.

Prophetic Example 5

Preparation of an Encapsulated Cyanine Dye Disc

A 12 cm diameter fused silica disc can be used as a support substrate. Two circular masks can be placed against the disc to mask the inner radial portion and the outer radial portion. A zinc sulfide-silica ($ZnS$—$SiO_2$) dielectric layer can be sputtered onto the middle radial portion. Azo-cyanine dye dissolved in a volatile solvent can be sprayed onto the middle radial portion on top of the dielectric layer. The solvent is allowed to evaporate, leaving behind the azo-cyanine dye data layer. A second zinc sulfide-silica ($ZnS$—$SiO_2$) dielectric layer can be sputtered onto the middle radial portion on top of the data layer. The two masks can be removed. A silver reflective layer can be sputtered to encapsulate the second dielectric layer, the data layer, and the first dielectric layer.

This would produce an optical information medium as shown in FIG. 7, where the silver reflective layer is the encapsulating layer.

All of the compositions and/or methods and/or processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the scope and concept of the invention.

What is claimed is:

1. An optical information medium comprising at least one support substrate, a first dielectric layer, at least one data layer, a second dielectric layer, and a reflective layer; wherein:
   the reflective layer is an covers layer, and encapsulates the second dielectric layer, the data layer, and the first dielectric layer;
   the optical information medium comprises an inner radial portion, a middle radial portion, and an outer radial portion;
   the support substrate is present in the inner radial portion, the middle radial portion, and the outer radial portion;
   the data layer is present in the middle radial portion, but not in the inner radial portion and the outer radial portion; and
   the encapsulating layer is present in the inner radial portion, the middle radial portion, and the outer radial portion.

2. The optical information medium of claim 1, further comprising at least one polymer coating layer.

3. The optical information medium of claim 1, wherein:
   the first dielectric layer is present in the middle radial portion, but not the inner radial portion and the outer radial portion;
   the data layer is present in the middle radial portion, but not in the inner radial portion or the outer radial portion;
   the second dielectric layer is present in the inner radial portion, but not the middle radial portion and the outer radial portion;
   the reflective layer is present in the inner radial portion, the middle radial portion, and outer radial portion;
   a cross-section of the inner radial portion intersects the reflective layer, then the support substrate, but not the first dielectric layer, the data layer, and the second dielectric layer;
   a cross-section of the middle radial portion intersects the reflective layer, then the second dielectric layer, then the data layer, then the first dielectric layer, then the support substrate; and
   a cross-section of the outer radial portion intersects the reflective layer, then the support substrate, but not the second dielectric layer, the data layer, and the first dielectric layer.

4. The optical information medium of claim 1, wherein:
   the first dielectric layer is present in the inner radial portion, the middle radial portion, and the outer radial portion;

the data layer is present in the middle radial portion, but not in the inner radial portion or the outer radial portion;

the second dielectric layer is present in the middle radial portion, but not the inner radial portion and the outer radial portion;

the reflective layer is present in the inner radial portion, the middle radial portion, and outer radial portion;

a cross-section of the inner radial portion intersects the reflective layer, then the first dielectric layer, then the support substrate, but not the second dielectric layer and the data layer;

a cross-section of the middle radial portion intersects the reflective layer, then the second dielectric layer, then the data layer, then the first dielectric layer, then the support substrate; and a cross-section of the outer radial portion intersects the reflective layer, then the first dielectric layer, then the support substrate, but not the second dielectric layer and the data layer.

5. The optical information medium of claim 1, wherein the medium has a higher mechanical stiffness than a corresponding medium prepared without an encapsulating layer.

6. The optical information medium of claim 2, wherein the polymer coating layer is selected from acrylate, styrene, carbonate, urethane, ethylene, acetate, acrylonitrile, acrylamide, polyphenolic resin, polyepoxide, or polyalcohol.

7. The optical information medium of claim 1, wherein the data layer comprises a metal or a metal alloy.

8. The optical information medium of claim 1, wherein the data layer comprises an organic dye.

9. The optical information medium of claim 1, wherein the first or second dielectric layer includes a material selected from the group of silicon, silicon dioxide, zinc sulfide-silicon dioxide, zirconium oxide, titanium oxide, tantalum oxide, germanium nitride, silicon-nickel oxinitride, aluminum oxide, or a combination thereof.

10. The optical information medium of claim 1, wherein the first or second dielectric layer includes a material selected from the group of silicon nitride, carbon nitride, boron nitride, or a combination thereof.

11. The optical information medium of claim 1, further comprising a thermal barrier layer that protects the support from heat generated during writing to the data layer.

12. The optical information medium of claim 1, wherein the reflective layer includes a metal or a metal oxide.

13. The optical information medium of claim 1, wherein the reflective layer includes gold, silver, copper, aluminum, nickel, chromium, titanium, an alloy thereof, or combinations thereof.

* * * * *